United States Patent [19]

Flanagan et al.

[11] 4,118,171

[45] Oct. 3, 1978

[54] METHOD FOR EFFECTING SUSTAINED COMBUSTION OF CARBONACEOUS FUEL

[75] Inventors: Paul Flanagan, Princeton, N.J.; Eric Roy Norster, Lexington, Mass.; Robert V. Carrubba, Bridgewater; Ronald M. Heck, Frenchtown, both of N.J.

[73] Assignee: Engelhard Minerals & Chemicals Corporation, Iselin, N.J.

[21] Appl. No.: 753,499

[22] Filed: Dec. 22, 1976

[51] Int. Cl.² .............................................. F23L 9/00
[52] U.S. Cl. .................................... 431/10; 60/39.02; 431/352
[58] Field of Search .................. 431/4, 10, 352, 353; 60/39.65, 39.71, 39.02

[56] References Cited

U.S. PATENT DOCUMENTS

| | | | |
|---|---|---|---|
| 3,376,098 | 4/1968 | Pryor | 431/10 |
| 3,925,002 | 12/1975 | Verdouw | 431/10 |
| 3,948,223 | 4/1976 | Benson | 431/10 X |
| 3,982,879 | 9/1976 | Pfefferle | 431/10 |

*Primary Examiner*—Edward G. Favors

[57] ABSTRACT

A method for effecting combustion of carbonaceous fuel is operative to sustain the combustion at a predetermined rate or rates of total fuel demand, the fuel being distributed between two combustion stages to make up the required total feed rate. Thus one portion, usually about 20–70 percent, of the total fuel is fed to a thermal combustion stage. Sufficient air is supplied simultaneously to the thermal combustion stage, preferably about 125 to 185 percent of the stoichiometric amount of air, to effect substantially complete combustion of that portion of the fuel and produce a heated effluent. An additional amount of relatively cool air is mixed with this effluent, and the resulting cooled mixture continues through the mixing zone, the additional air being sufficient to inhibit preburning of the remaining portion of the fuel which is added downstream in the mixing zone. This cooled mixture in the mixing zone, upon and following the introduction of the additional fuel, is at temperatures within the range of about 500°–1200° F. The enriched fuel-air admixture then is combusted in the presence of a catalyst, the admixture providing combustion conditions in the catalyst stage giving a high rate of heat release without substantial formation of pollutants.

12 Claims, 2 Drawing Figures

METHOD FOR EFFECTING SUSTAINED COMBUSTION OF CARBONACEOUS FUEL

BACKGROUND OF THE INVENTION

This invention relates to methods for combusting carbonaceous fuels including gaseous fuels such as natural gas and liquid fuels such as fuel oil. In U.S. Pat. No. 3,928,961, granted Dec. 30, 1975, in the name of William C. Pfefferle and assigned to the same assignee as that of the present invention, there is disclosed and claimed a process designated catalytically-supported, thermal combustion. According to this method carbonaceous fuels can be combusted very efficiently and at reaction rates characteristic of thermal (homogeneous) combustion, although the combustion is effected in the presence of a solid oxidation catalyst at temperatures below nitrogen-oxide-forming temperatures. Ordinarily the operating temperature of a catalyst in catalytically-supported, thermal combustion is in the range of approximately 1700°–3200° F., for example near the middle of this temperature range. It has been found to be desirable, for combusting various types of carbonaceous fuels, to carry out the combustion in more than one stage, including at least one stage utilizing a catalyst and at least one thermal combustion stage. Thus, in the aforementioned U.S. Pat. No. 3,928,961 there is described and claimed the method in which catalytically-supported, thermal combustion is carried out in the presence of a catalyst, followed by thermally combusting a partially combusted effluent from the catalyst stage. Also, in another U.S. patent in the name of William C. Pfefferle, U.S. Pat. No. 3,846,979, granted Nov. 12, 1974, to the same assignee as that of the present invention, there is disclosed a method in which carbonaceous fuel is partially combusted in a thermal combustion zone, followed by immediately quenching the effluent containing the partially combusted fuel, and then contacting the quenched effluent with a catalyst to oxidize some or all of the uncombusted fuel from the thermal combustion zone.

In one of the examples in the last mentioned U.S. Pat. No. 3,846,979, diesel fuel and compressed air in an amount 10% in excess of the stoichiometric amount of air for complete combustion of the fuel are supplied to the thermal combustor to produce an effluent of about 90% oxidized fuel, which is quenched with sufficient excess air to provide an adiabatic flame temperature of 1500° F. (815° C.). The fuels mentioned in the examples of that patent are diesel fuels, or jet fuels of the type customarily used in aircraft gas turbine engines. Under typical conditions for such engines, operating at a pressure of 20 atmospheres, the quenched effluent is said to have an adiabatic flame temperature of 1500° F. The actual temperature of the quenched effluent would be about 100°–200° F. below its adiabatic flame temperature, i.e., above 1300° F. (above 700° C.), by virtue of the small portion of unoxidized fuel from the thermal combustor. According to this example in the patent sufficient additional fuel is sprayed into the effluent to raise the adiabatic flame temperature to 2600° F. (1425° C.), and the resulting admixture then is passed to the catalyst stage and fully combusted. The temperature at the outlet of the thermal combustion zone is said to be in excess of 3300° F. (1800° C.) before quenching and the outlet temperature from the catalyst is 2500° F. (1370° C.).

While the combustion method just described is suitable for certain types of fuels and operating conditions, the quenching operation tends to be difficult to carry out with the amounts of fuel provided in the mixture entering the thermal combustor. Thus, vigorous mixing of the quenching air with the partially oxidized thermal combustion effluent is required to stop the oxidation; this mixing involves turbulence with undesirable pressure drops in the quenching zone, and the combustion-quenching action still may be difficult to sustain in the event of transient disturbances. Moreover, reliable avoidance of preignition and further combustion, as soon as the additional fuel is sprayed into the quenched effluent as disclosed in the patent, may be difficult in practice unless the quenched effluent is substantially cooler than that indicated in the example of the patent. It is an object of the present invention to overcome such problems in carrying out a two-stage combustion process utilizing a thermal combustion stage followed by combustion in the presence of a catalyst.

Another invention of William C. Pfefferle, also assigned to the same assignee as that of the present invention, is described in U.S. patent application Ser. No. 644,873, filed Dec. 29, 1975, now U.S. Pat. No. 4,019,316. That invention addresses the problem of starting a combustion system utilizing a catalyst. A fuel-air mixture is combusted at start-up in a thermal combustion zone to provide a source of heat, and this heat is directed to the catalyst in the substantial absence of unburned fuel to bring the catalyst to a temperature at which it will sustain mass transfer-limited operation. The catalyst temperature attained during this start-up operation thus would be sufficient to ignite a mixture of carbonaceous fuel and air, and such catalyst temperature may approach the operating temperature for effecting catalytically-supported, thermal combustion of such mixture in the presence of a catalyst. The purpose of the invention of the aforesaid application Ser. No. 644,873, now U.S. Pat. No. 4,019,316 is to avoid the grossly incomplete combustion which may occur in the catalyst if a fuel-air mixture passes through the catalyst while it is cold. The effluent from such incomplete combustion may pollute the surrounding atmosphere with undesirably high amounts of unburned hydrocarbons and carbon monoxide. Effluent from the thermal combustion zone utilized during start-up in accordance with the invention of the application Ser. No. 644,873, now U.S. Pat. No. 4,019,316 is not permitted to contact the catalyst unless it is free of unburned fuel, which has the dual advantage of avoiding damage to the catalyst through burning of fuel after absorption on the catalyst when cold, or, in the absence of such burning on the catalyst, of avoiding passage of unburned fuel through the catalyst to the atmosphere. As soon as the catalyst has been heated to a temperature at which it can function to burn the fuel in the mixture passing through it, practically all of the fuel-air mixture is fed directly to the catalyst for sustained, steady state operation, and the fuel supply to the thermal combustion stage used for start-up is cut off or cut back drastically. Thus after ignition is achieved in the catalyst, the thermal combustion either ceases, or is carried out at a low level of fuel supply at which it serves an entirely different function and merely assists in vaporizing the fuel. There may be an intervening short period during which the thermal preburning continues at appreciable levels until regenerative preheating of the inlet air is established, this period depending on the initial temperature and the mass of the heat exchanger.

While the above described method of application Ser. No. 644,873, now U.S. Pat. No. 4,019,316 may be eminently useful in achieving start-up in a combustion system utilizing a catalyst, it is an object of the present invention to effect sustained combustion of carbonaceous fuel in a combustion system utilizing a catalyst wherein a preburner is used throughout the operation of a combustion system, or during sustained combustion therein under certain operating conditions such as operation within predetermined fuel demand ranges or operation utilizing predetermined fuel-air ratios.

SUMMARY OF THE INVENTION

Accordingly, a new and improved method for effecting sustained combustion of a carbonaceous fuel at predetermined total rates of fuel demand utilizes combustion apparatus including a thermal combustion zone and, downstream thereof in succession, a mixing zone and a catalyst zone. For at least one of the predetermined total rates of fuel demand, substantial portions of the fuel are burned in each of the thermal combustion zone and the catalyst zone. During operation at such fuel demand rate a substantial portion of the fuel is supplied to the thermal combustion zone while simultaneously supplying air to the thermal combustion zone to effect substantially complete combustion therein of the fuel being supplied thereto with formation of a heated effluent. An additional amount of relatively cool air is added to the heated effluent in an upstream portion of the mixing zone to obtain a cooled mixture, to which is added, while passing through a downstream portion of the mixing zone, a substantial additional portion of the fuel, making up the total needed for the prevailing fuel demand rate, thus providing an enriched fuel-air admixture. That admixture then is combusted in the presence of the catalyst to form an effluent of high thermal energy. The additional amount of air added to the heated thermal combustion effluent is sufficient to maintain the cooled mixture and the enriched fuel-air admixture at a temperature within the range of about 500°–1200° F. (about 250°–650° C.) in the mixing zone and to inhibit preburning therein of the aforesaid additional fuel. The resulting fuel-air admixture furthermore has an adiabatic flame temperature such that, upon contact with the catalyst, the operating temperature of the catalyst is substantially above the instantaneous auto-ignition temperature of the enriched fuel-air admixture but below a temperature that would result in any substantial formation of oxides of nitrogen.

BRIEF DESCRIPTION OF THE DRAWINGS

The present invention is described further in connection with the following drawings.

DETAILED DESCRIPTION

Figure 1:
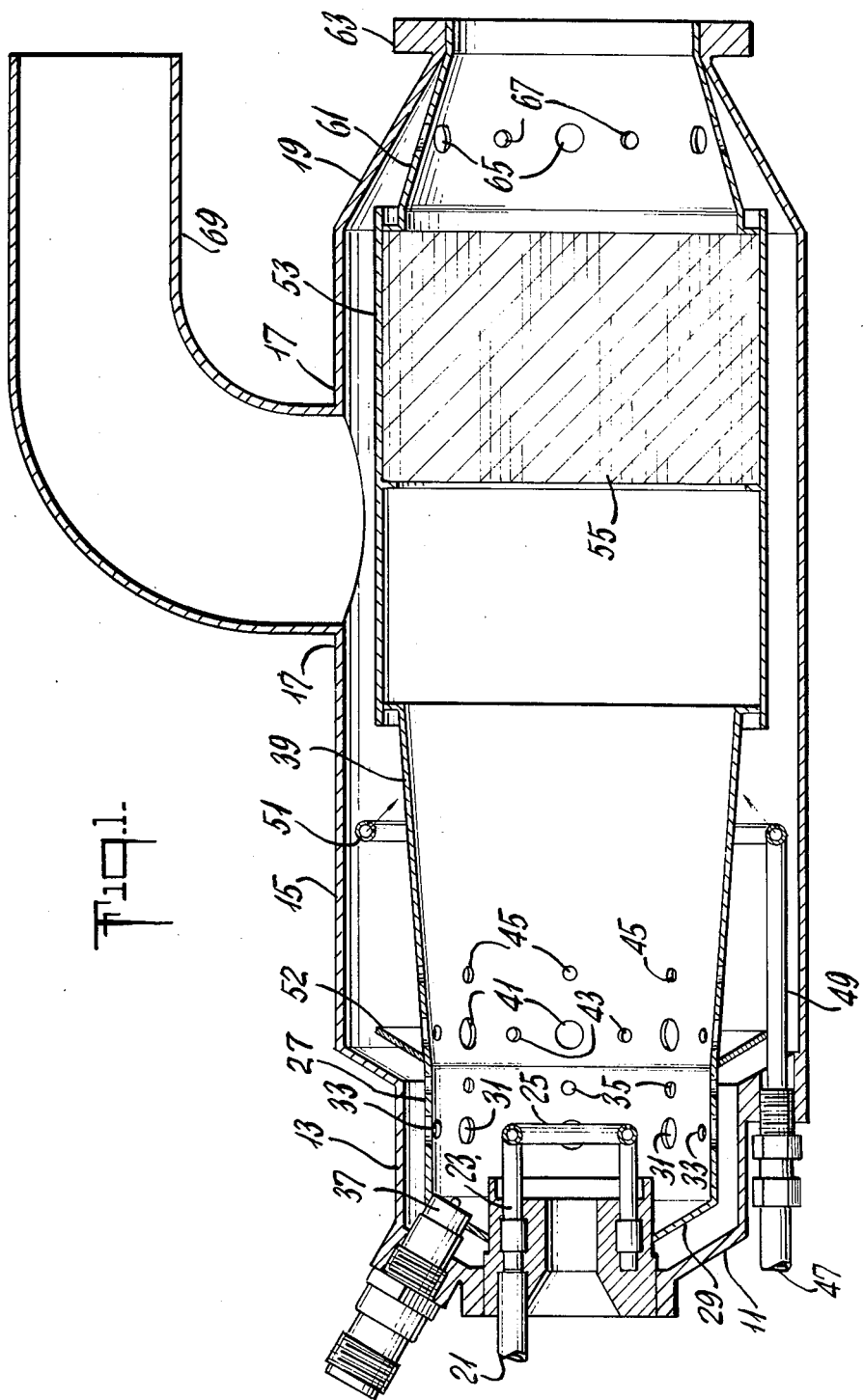
FIG. 1 is a schematic representation of a two stage combustion system for operation in accordance with the method of the present invention and particularly adapted for burning gaseous carbonaceous fuel.

Referring now to FIG. 1, there is illustrated in schematic form, based on a central longitudinal cross section, apparatus suitable for carrying out a method for effecting sustained combustion, not only at a designed fuel demand rate but also at substantially lower demand rates, of a carbonaceous fuel which when burned with a stoichiometric amount of air has an adiabatic flame temperature of at least about 3300° F. (about 1800° C.). Gaseous fuels suitable for combustion in the apparatus of FIG. 1 include, for example, hydrocarbons such as the lower alkanes, notably methane in natural gas, propane which may contain propylene, or butane, carbon monoxide, and coal gas.

The combustion apparatus is provided with an exterior housing including an external housing section 11 of generally conical shape forming the inlet end of the apparatus, a cylindrical housing section 13 adjoining the section 11 and defining generally the longitudinal extent of an internal thermal combustion zone, a cylindrical housing section 15 of larger diameter adjoining the section 13 and defining at its leftmost longitudinal portion an upstream or quenching portion of a mixing zone while the portion of the housing section 15 to the right thereof defines the remaining downstream portion of the mixing zone, a further cylindrical housing section 17 adjoining the section 15 and defining a catalyst zone, and an inwardly tapered housing section 19 adjoining the downstream end of section 17 and defining a dilution zone.

An inlet 21 is provided in the external housing section 11 for feeding a primary portion of the carbonaceous fuel to the combustion apparatus. The fuel inlet 21 is connected through a line 23 to a circular primary fuel manifold 25, provided with openings at intervals around the manifold for discharging the primary fuel into the thermal combustion zone.

The combustion apparatus also is provided with an internal housing inside the exterior housing, which includes an internal housing section 27 having a generally conical closure 29 at its leftward or upstream end which retains the primary fuel within the thermal combustion zone. Primary air enters the thermal combustion zone from the space between the external housing section 13 and the internal housing section 27 through a first series of large air inlet openings 31 spaced around the housing section 27 and through a second series of smaller air inlet openings 33 interspersed between the openings 31 around the housing section 27. Additional primary air openings 35 are spaced around the housing section 27 near the downstream end of the thermal combustion zone. An igniter 37 is inserted through the conical housing sections 11 and 29 into the upstream end of the thermal combustion zone.

If desired and convenient, the primary fuel may be premixed with some or all of the primary air before injection into the thermal combustion zone. Thus the apparatus of FIG. 1 may be modified to permit feeding of the primary fuel and air together to the thermal combustion zone through a single inlet or group of inlets. If this is done, the conventional precautions should be taken to avoid flashback from the combustor zone.

An internal housing section 39, conveniently of gradually increasing diameter, connects with the section 27 and surrounds the mixing zone concentrically within the external housing section 15. Air for cooling the effluent from the thermal combustion zone enters the upstream portion of the mixing zone from the space between the external housing section 15 and the internal housing section 39 through a series of large openings 41 distributed around the internal housing section 39 just downstream of the thermal combustion zone defined by the internal housing section 27. Additional air enters through a series of smaller openings 43 interspersed between the openings 41 around the housing section 39. Still more air passes through the housing section 39 through a series of additional openings 45 spaced around the internal housing section 39 farther downstream in the mixing zone. It will be understood that the cooling air entering through the openings 41, 43, 45 in the internal housing section 39 also supplies secondary combustion air for the combustion which will take place in the catalyst zone downstream of the mixing zone defined by the housing section 39. Some or all of the air passing through the more upstream openings 35 also may serve for cooling and quenching the products of thermal combustion of the primary fuel introduced through manifold 25. When burning gaseous fuels, the amount of air actually passing through the openings 31 and 33 may be such as to result in burning in fuel-rich proportions in regions near and upstream of the fuel manifold 25. Thereupon incompletely burned primary fuel is substantially completely combusted using additional air entering through the openings 35 or even through the openings 41 and 43, followed promptly by cooling (quenching) achieved by means of further mixing with air supplied through the openings 41, 43, and 45 to avoid premature ignition of secondary fuel introduced as about to be described.

An inlet 47 for secondary fuel is located for convenience at the upstream end of the apparatus. The inlet 47 provides access to a line 49 within the external housing section 15, which leads in the downstream direction to a circular secondary fuel manifold 51 surrounding the internal housing section 39 around the downstream portion of the mixing zone. Secondary fuel is injected into the mixing zone as follows: Suitably located holes release the fuel from points around the manifold 51 in a downstream and inward direction, as indicated by arrows in FIG. 1. Air passing leftward between the housing sections 15 and 39 carries the fuel toward the holes 41, 43, 45 and into the interior of the mixing zone, through which passes a cooled or quenched effluent from the thermal combustion zone. A baffle 52 prevents most of the air carrying the secondary fuel from passing toward the holes 31, 33, 35. It will be appreciated that no rigorous separation need be maintained between the upstream mixing or quenching portion and the downstream portion of the mixing zone, except as needed to admit sufficient air to cool the thermal combustion effluent in time to inhibit preburning in the mixing zone of the fuel supplied from manifold 51.

A cylindrical internal housing section 53 is connected to the downstream end of the internal housing section 39 and contains a catalyst 55 of cylindrical shape mounted by suitable structures within the internal housing section 53. It will be appreciated that the slight increase in diameter where section 53 is joined to section 39, occasioned by a narrow outward flange at the forward end of section 39, which permits the provision of a fillet beneath the rearward overhang of section 53, is provided simply to facilitate rigid joining of the two sections, and causes no appreciable disturbance or recirculation in the flow of gases through these two internal housing sections. The catalyst 55 preferably is one or more monolith catalysts of the honeycomb type which has internal gas flowthrough passageways extending in the axial direction of the cylindrical housing 53. In one form such catalyst may utilize as a support a monolith of refractory zircon-mullite which is not itself catalytically active. The internal flowthrough passageways of the monolith are coated with a calcined layer of alumina of high surface area, which may be stabilized for the higher operating temperatures by inclusion of another oxidic material such as ceria. Incorporated in or on the alumina layer is a small amount of catalytically active platinum group metal, such as platinum or palladium or both.

Connected to the downstream end of the internal housing section 53 is a final internal housing section 61, which tapers in diameter to meet the downstream end of the external housing section 19. A ring-shaped end member 63 receives on its inner surface the downstream ends of both the external housing section 19 and the internal housing section 61.

Dilution air for mixing with the effluent from the catalyst 55 may enter the dilution zone within the internal housing section 61 from the space between that section and the external housing section 19 through a series of large openings 65 distributed around the internal housing section 61, and additional dilution air may enter the dilution zone through a series of smaller openings 67 interspersed between the openings 65 around the housing section 61.

An air intake duct 69 of large diameter is located for convenience at the side of the downstream end of the combustion apparatus and connects to one side of the external housing section 17, giving access for passage of primary combustion air, quenching and secondary combustion air, and dilution air to the space between the external housing section 17 and the internal housing section 53. This space connects in the upstream axial direction with the space between the external housing section 15 and the internal housing section 39, which connects in turn in the upstream direction with the space between the external housing section 13 and the internal housing section 27. In the downstream direction of the combustion apparatus the space between the external housing section 17 and the internal housing section 53, supplied by the air intake duct 69, communicates with the space between the external housing section 19 and the internal housing section 61.

In the operation of the two-stage combustion system utilizing the apparatus of FIG. 1, sustained combustion of the gaseous carbonaceous fuel is effected at predetermined total rates of fuel demand which may include for example a start-up or standby fuel demand rate and a normal demand rate, possibly with operation also at intermediate rates and at an even higher maximum rate. Achieving these various rates may involve problems in maintaining stability of sustained combustion and in avoiding excessive excursions of catalyst temperature. For example, at low demand the catalyst inlet temperature may tend to fall so low as to be below the dependable ignition temperature for the mixtures of fuel and air which reach the catalyst then or during later operation. On the other hand, preignition of secondary fuel may tend to occur at maximum fuel feed rates. In general a greater proportion of the total fuel feed is supplied to the thermal combustion zone at the lowest fuel feed rates in order to maintain the catalyst at a suitably elevated minimum operating temperature. In fact the apparatus advantageously may be operated in an idle mode with no secondary fuel at all supplied to the mixing zone, while maximum power advantageously may be sustained, using some fuels, with no burning of fuel in the thermal combustion zone.

However, it has been found to be preferable in most circumstances to supply to the thermal combustion zone, for substantially complete combustion therein, between about 20 percent and about 70 percent of the total amount of fuel being supplied. The thermal combustion products in the resulting effluent then are cooled to avoid preignition and preburning of the additional or secondary fuel, which is introduced into the mixing zone to replenish the fuel in the system and thus provide a fuel-air admixture containing (that is, enriched by) the secondary fuel. When this is done, the cooled mixture from the thermal combustion zone, and the enriched fuel-air admixture formed with the secondary fuel, are maintained in the mixing zone at temperatures within the range of about 500°–1200° F. (about 250°–650° C.), and preferably within the range of about 700°–1000° F. (about 375°–550° C.).

For all such conditions of operation, combustion apparatus is provided which includes the thermal combustion zone within the internal housing section 27, and, downstream thereof in succession, a mixing zone generally within the internal housing section 39, and a catalyst within the internal housing section 53. Especially when the effluent from the combustion apparatus is to drive a gas turbine, the further internal housing section 61 is useful to provide air dilution or mixing with the catalyst effluent, which ensures that motive gases do not reach the turbine blades at excessive temperatures.

While fuel is being supplied not only to the mixing zone but also in substantial amounts to the thermal combustion zone for burning therein with formation of a heated effluent, certain operating conditions are maintained in a manner described hereinbelow. During such operation one portion of the fuel is fed to the inlet 21, preferably between about 20 percent and about 70 percent of the total amount of fuel needed for the fuel demand rate at which the combustion is being effected. The fuel may be, for example, commercial propane containing propylene. The fuel passes from inlet 21 through line 23 and is injected into the thermal combustion zone from manifold 25. Air is supplied simultaneously through openings 31, 33, and 35 to the thermal combustion zone to effect substantially complete combustion therein of the portion of the fuel being supplied thereto. The fuel and air feed rates preferably are adjusted so that the air so supplied is maintained at between about 125 percent and about 185 percent of the stoichiometric amount needed for complete combustion of the fuel so supplied.

To achieve stable combustion in the thermal combustion zone the burning actually may occur during mixing of the fuel and air in areas or regimes where the air-fuel ratio approaches more nearly the stoichiometric ratio, followed immediately within the combustion zone by more thorough mixing of the gaseous materials including the combustion products. Stability of combustion may be enhanced for air-fuel ratios substantially leaner or richer than the stoichiometric ratio (depending on fuel injection rates relative to air pressure and the disposition of the openings from the compressed air plenum to the interior of the combustor) by permitting recirculation of the burning gases so that regimes of slower-moving gases may permit propagation of the oxidation reaction at the slower speeds characteristic of such mixtures, which are continuously ignited by the heated reaction products leaving the regimes which support such burning. This may occur, for example, in the region adjacent to the conical closure 29 where little or no fuel or air enters the combustion chamber. As the fully combusted effluent from the thermal combustion zone enters the quenching zone adjacent to the upstream end of the space within the housing section 39, an additional amount of air passes through the openings 41, 43, and 45 for mixing with the heated effluent from the thermal combustion zone. The resulting mixture, cooled by the added air, passes on through the mixing zone to the downstream end of the external housing section 37. It will appear, incidentally, from the general configuration of the internal housing sections 39 and 53 as described hereinabove and illustrated in FIG. 1, that the gases leaving the thermal combustion zone within housing section 27, as they pass through the sections 39 and 53 to the catalyst 55, move axially along the apparatus substantially without obstruction at almost constant (and rapid) speed in a straight-through flow pattern (the diameter of section 39 increasing only gradually and the diameter of section 53 being constant); thus there is no substantial recirculation or stagnation of the gases as they flow from the thermal combustion zone through the mixing zone and to the entrance of the catalyst.

An additional portion of the fuel, making up the total needed for the fuel demand rate in effect, is added to the cooled mixture passing through the downstream portion of the mixing zone to provide an enriched fuel-air admixture. This secondary fuel is fed through inlet 47, line 49, and the manifold 51 to be mixed with some of the secondary air supplied in the regions adjacent to the outer surface of the internal housing section 39. However, the total amount of secondary air added through the openings 41, 43, and 45 is sufficient to maintain the enriched fuel-air admixture within the desired temperature range and, through its cooling or quenching action upon mixing with the effluent from the thermal combustion zone, is sufficient to inhibit preburning or preignition of the additional fuel added in the mixing zone. The resulting enriched intimate admixture of fuel and air passes to the catalyst 55.

For effecting catalytically-supported, thermal combustion upon contact with the catalyst 55, the enriched fuel-air admixture entering the catalyst has an adiabatic flame temperature such that, upon contact with the catalyst, the operating temperature of the catalyst is substantially above the instantaneous auto-ignition temperature of such fuel-air admixture but below a temperature that would result in any substantial formation of oxides of nitrogen. It will be understood that the composition and temperature of the enriched fuel-air admixture, which determine its adiabatic flame temperature upon its initial contact with the catalyst, are determined in turn by the inlet air temperature and to a minor degree the inlet fuel temperature, by the heat and combustion products developed through burning in the thermal combustion zone as a result of the portioning of some of the total fuel feed to the primary fuel inlet 21, as well as by the amounts of primary combustion air which pass through the openings 31, 33, and 35 to the thermal combustion zone and the amounts of quenching and secondary combustion air which pass through the openings 41, 43, and 45 to the mixing zone, and of course also by the secondary fuel fed to the inlet 47.

The enriched fuel-air admixture entering the catalyst from the downstream end of the mixing zone then is combusted in the presence of the catalyst 55 and passes into the dilution zone within the internal housing section 61, where additional air is admitted through the openings 65 and 67 to obtain a final effluent having a desired temperature. This effluent is suitable, for example, for driving a gas turbine to generate power, or for passage to heat exchange apparatus, thus utilizing the energy developed by the sustained combustion of the fuel fed to the fuel inlets 21 and 47. In a convenient arrangement the effluent from the dilution zone first drives a turbocharger air compressor (not shown), which may be mounted on the ring member 63. Ambient air passes through the compressor, which is connected to supply compressed air to the air intake duct 69. The effluent from the turbine side of the turbocharger then may be passed, as suggested above, to equipment such as a power turbine or heat exchanger for utilizing the hot combustion effluent. It will be understood that the sizes and distribution of the air supply openings 31, 33, 35, 41, 43, 45, 65, and 67 are established by the design of the combustion apparatus, depending on the pressure at the compressed air intake, for obtaining a desired rate of feeding and distribution of the primary air, quenching and secondary combustion air, and dilution air.

No provision is made in the apparatus shown in the drawings for removal of heat from the combustion apparatus, by transfer of heat from the catalyst or otherwise. Accordingly, the sustained combustion of the carbonaceous fuel, even high-energy fuels tending to burn at high temperatures, is carried out under essentially adiabatic conditions at temperatures approaching the adiabatic flame temperature of the mixture under combustion, and generally within 50°–300° F. of such adiabatic flame temperature. Especially with high-energy fuels the adjustment of the enriched fuel-air admixture entering the catalyst to have an adiabatic flame temperature below nitrogen-oxide-forming temperatures is important. Ordinarily the operating temperature of the catalyst should be maintained well below 3300° F. and in the range of about 1700°–3200° F. (about 925°–1750° C.), and preferably at about 2000°–3000° F. (about 1100°–1650° C.).

The term "instantaneous auto-ignition temperature" for a fuel-air admixture as used herein and in the appended claims is defined to mean that temperature at which the ignition lag of the fuel-air mixture entering the catalyst is negligible relative to the residence time in the catalyst combustion zone of the mixture undergoing combustion therein.

Although the present invention is described herein with particularity to air as identifying the non-fuel components supplied to the combustion apparatus, it is well understood that oxygen is the required element to support combustion. Where desired, the oxygen content of a non-fuel component can be varied, and the term "air", as used herein to refer to the non-fuel components, includes any gas or combination of gases (which may or may not contain some products of previous combustion) containing oxygen available for combustion reactions. It may be observed, however, that the air supplied as a quenching fluid advantageously is at the lowest available temperature, usually the discharge temperature of the compressor or blower supplied with ambient air, to facilitate attainment of the desired temperature in the cooled mixture which passes through the mixing zones.

The method of the present invention, which may be carried out in apparatus such as that illustrated and described in connection with FIG. 1 of the drawings, has been found to be particularly convenient and effective in obtaining efficient combustion of various kinds of carbonaceous fuels through appropriate proportioning under various fuel demand conditions of the primary and secondary fuel supplied respectively to the thermal combustion zone and, via the mixing zone, to the catalyst zone. Changes in operating conditions may be compensated for by changing the proportions or ratio of primary and secondary fuel-feeding rates. Moreover, changes in the fuel itself likewise may be compensated for without undesirable effects on rate or efficiency of energy production, or on avoidance of formation of nitrogen oxides and other pollutants. Thus, for example, changes in the proportions of propylene or hydrogen which may be contained in a gaseous fuel can be compensated for by establishing for each fuel composition an optimum predetermined schedule for proportioning of the total fuel-feeding rate between the primary and secondary fuel supplied.

In determining the proportions of fuel fed to the thermal combustion zone and to the catalyst zone, it is desirable generally to limit the rate of feed to the thermal combustion zone so as to burn as much of the fuel in the catalyst zone as is consistent with dependable and efficient overall operation. The thermal combustion may take place in localized regimes at temperatures which tend to approach the adiabatic flame temperature of a stoichiometric mixture of the fuel and air. With the specified fuels such thermal combustion temperature exceeds the temperature above which substantial formation of nitrogen oxides commences through fixation of the atmospheric nitrogen in the combustion air. However, by limiting the total quantities of fuel burned in the thermal combustion zone, and by restricting the residence time in that zone of the primary fuel and air and their thermal combustion products prior to cooling with the additional air, the formation of nitrogen oxides upstream of the catalyst stage is minimized. Moreover, dilution of the effluent from the thermal combustion zone with relatively large quantities of additional secondary or quenching air and with the combustion products produced in the catalyst stage (which can be practically free of pollutants) results in a final effluent having such low proportions of oxides of nitrogen as to be acceptable for discharge into most or all environments.

Figure 2:
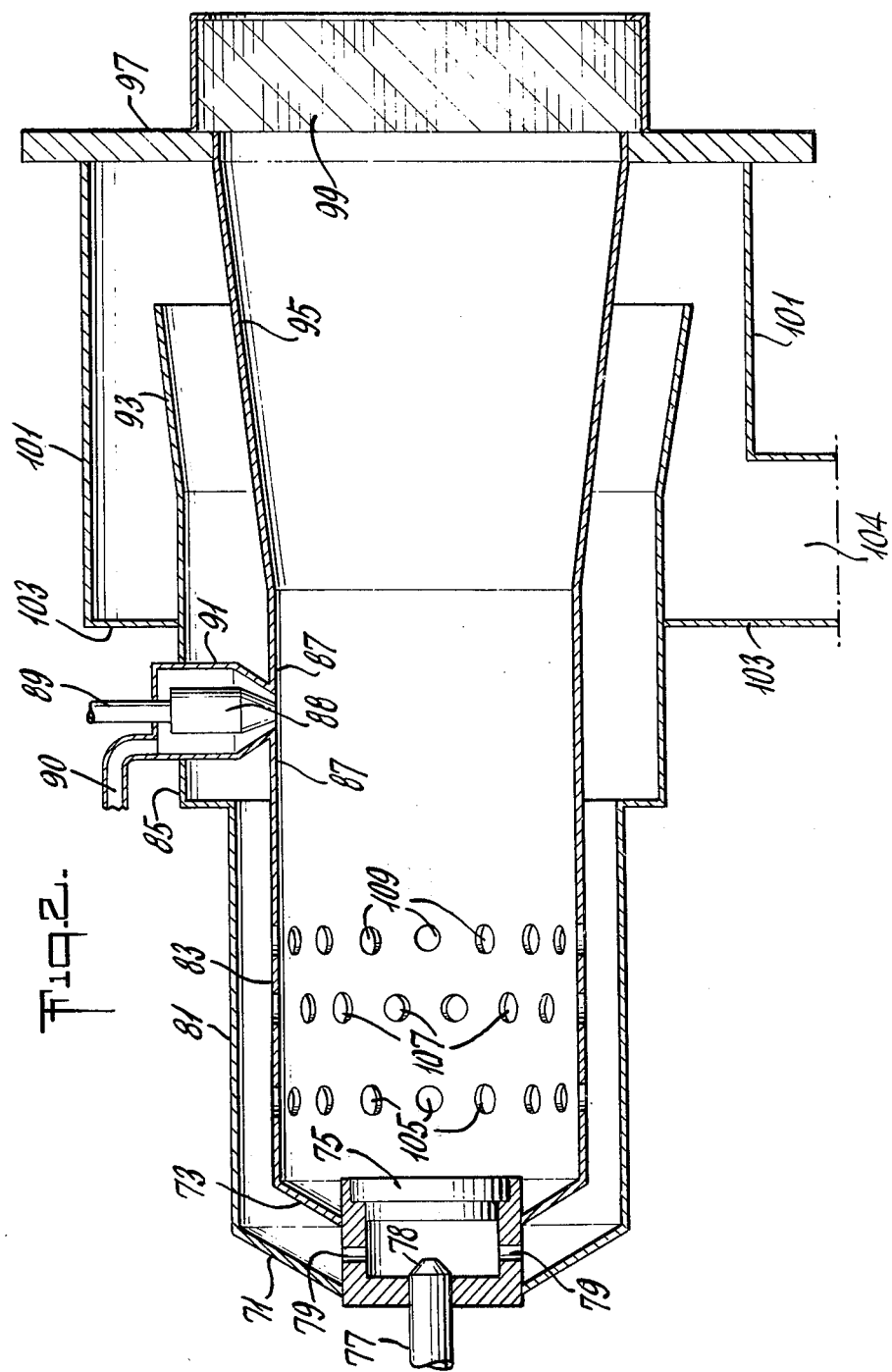
FIG. 2 is a schematic representation of a two stage combustion system for carrying out the method of the present invention, particularly when the fuel to be burned is a liquid carbonaceous fuel such as fuel oil.

Referring now to FIG. 2, there is shown in schematic representation, based on a longitudinal axial cross section, apparatus for carrying out the method of the invention to effect sustained combustion of a liquid fuel. Examples of suitable liquid carbonaceous fuels are gasoline, aromatic hydrocarbons such as benzene, toluene, ethylbenzene, and xylene; and naphtha, diesel fuel, jet fuel, other middle distillate fuels, hydrotreated heavier fuels, and the like; also utilizable are alcohols such as methanol, ethanol, and isopropanol, ethers such as diethyl ether, and aromatic ethers such as ethyl phenyl ether.

The two stage combustor of FIG. 2 includes at the intake end a generally conical external housing section 71 spaced from a generally conical internal housing section 73. At the inner ends of these sections 71 and 73 there is supported a cylindrical structure 74, closed at its left end, for feeding primary fuel, utilizing a swirl injector 75 of conventional design at the right end of the structure 74. Primary fuel, such as No. 2 fuel oil, may be introduced to the interior of the structure 74 and thence to the blades of the swirl injector through a fuel supply pipe line 77 feeding a nozzle 78. The interior of the cylindrical structure 74 also is supplied with primary fuel injection-assisting air through radial ports 79 in the cylindrical structure 74. The upstream end closure of the combustion apparatus may include transparent windows (not shown), formed in alignment in the walls of the housing sections 71 and 73, for viewing the interior of the combustion apparatus, as well as sampling means (not shown) for removing samples of the fuel-air mixtures from the upstream end of the interior of the combustor.

External housing section 71 and internal housing section 73 are joined at their outermost or downstream ends to respective external and internal housing sections 81 and 83 of cylindrical shape, which define an upstream thermal combustion zone and, continuing axially downstream thereof, also define the upstream or quenching portion of a mixing zone. The mixing zone then is defined further downstream by an external housing section 85 of greater diameter than the section 81 and an internal housing section 87 which is a continuation in the longitudinal direction of the internal housing section 83. Provision for injection of secondary liquid fuel is afforded by several air-assisted injectors disposed peripherally about the downstream portion of the mixing zone defined by the housing sections 85 and 87. These injectors, one of which is shown schematically, are of conventional design, and each includes an injection nozzle 88 fed by a secondary fuel supply line 89, the nozzle 88 passing through the external housing section 85, with the end of the nozzle communicating through the wall of the internal housing section 87 into the interior mixing zone. Secondary fuel injector-assisting air is available from a compressed air line 90 entering a housing 91 surrounding the nozzle 88, the assist air passing into the interior of housing section 87 through an annular space surrounding the end of nozzle 88 to mix at high velocity with the fuel droplets leaving the nozzle.

The external housing section 85 extends in the downstream direction as a cylindrical shape having a downstream end portion 93 of somewhat increasing diameter. An internal housing section 95 of gradually increasing diameter, defining an extension of the mixing zone giving a transition to the catalyst zone, is connected to the downstream end of the internal housing section 87, forming a torroidal space of constant cross-sectional area with the expanding portion 93 of the external housing. The downstream end of the internal housing section 95 terminates in a mounting plate or ring 97 having a central opening. A catalyst 99 with gas flowthrough passageways extending in the axial direction is mounted to the inner portion of the ring 97 at its downstream side. Thus, as with the apparatus of FIG. 1, it will appear from the configuration of the cylindrical internal housing sections 83 and 87 and the gradually widening transition section 95, as illustrated in FIG. 2, that the gases pass from the upstream thermal combustion zone to the catalyst 99 in straight-through fashion without substantial recirculation or stagnation.

To provide for uniform distribution of air to the spaces between the external housing sections and the internal housing sections, an additional cylindrical housing section 101 of greater diameter than the external housing section 93 is disposed around the apparatus exteriorly of the internal housing 95 defining the transition portion of the mixing zone. The housing section 101 is closed on its upstream end by a ring-shaped lateral plate 103 and on its downstream end by the ring 97. Primary air and quenching secondary air enter from a blower or compressor (not shown) through an air intake duct 104 which enters the housing section 101 at one side thereof. The entering air distributes itself peripherally throughout the spaces between the outermost housing section 101 and the housing section 93, communicating with the space between the housing section 101 and the internal housing section 95 to the left of the ring 97, which in turn communicates, through the space between the external housing section 93 and the internal housing section 95, with the upstream portion of the apparatus.

In the operation of the apparatus of FIG. 2, primary liquid fuel, such as No. 2 fuel oil, is fed through line 77 and nozzle 78 and enters the swirl injector 75. Air entering the downstream portion of the apparatus, as just described, travels between the external housing section 85 and internal housing section 87 surrounding the mixing zone and continues between the external housing section 81 and the internal housing section 83 past the upstream portion of the mixing zone and the primary combustion zone into the space between the external housing section 71 and the internal housing section 73 at the upstream end of the apparatus. Some primary assist air or swirl air passes through the ports 79 and enters the swirl injector 75 along with the primary fuel to disperse the fuel into the thermal combustion zone. The arrangement of the cylindrical structure 74 and the swirl injector 75 with liquid fuel injector 78 and primary assist air ports 79 may be modified in various ways known to the combustion engineer for achieving suitable injection of liquid fuels. Thus primary injection-assisting air at higher pressure may be fed through a separate line, replacing the ports 79, for effecting injection of a finely dispersed fuel spray through high pressure nozzles (not shown), or the liquid fuel may be fed as a film on dispersing surfaces subject to high velocity blasts from a separate source of compressed air to inject a fine spray of primary fuel into the upstream portion of the interior of the combustor.

Primary air enters the thermal combustion zone through a series of openings 105 spaced around the internal housing section 83. The effluent from the thermal combustion zone then is cooled or quenched by an additional amount of air, serving as quenching air and secondary combustion air, which enters through a first series of air inlet openings 107 spaced around the housing section 83 and through a second similar series of air inlet openings 109 interspersed between the openings 107 but somewhat downstream thereof. The resulting cooled mixture passes downstream along the mixing zone, wherein an additional portion of the liquid fuel is added to the cooled mixture to provide an enriched fuel-air admixture at the downstream end of the mixing zone provided by the transition portion thereof within the expanding housing section 95. The admixture then enters the catalyst 99 for combustion in the catalyst zone. This additional portion of the liquid fuel, comprising the secondary fuel feed, enters the mixing zone from the several inlet lines 89 through injector nozzles 88, some injection-assisting air being added from the compressed air line 90 through the housing 91 surrounding each nozzle 88.

The operation of the two stage combustor of FIG. 2 is generally similar to that of FIG. 1. The intake air may be supplied at relatively low pressure when, for example, the combustor is used to supply air for process heating. In such applications a compressor may not be needed, and the air supply may be from a blower (not shown) at low pressures. The final effluent from the catalyst 99 then may pass to heat exchangers, or may be caused to impinge directly on or mix directly with solids or fluids to be treated.

It is highly desirable to insure that the secondary fuel is injected as a very fine, well distributed mist from the lines 89 disposed around the housing section 87 through suitable design and adjustment of the conventional air-assisted secondary fuel injectors. Thus, after passage along the elongated mixing zone and transition section within the housing sections 87 and 95, the fuel is substantially completely dispersed, evaporated, and mixed with the heated gaseous materials from the thermal combustion zone and the air supplied for mixing therewith, whereby the enriched fuel-air admixture from the mixing zone has the form of an intimate admixture of fuel and non-fuel components upon contact with the catalyst. Dilution air, when desired, may be added to the final effluent as with the FIG. 1 arrangement; no provision for supplying dilution air has been shown in FIG. 2.

Examples of operation of the apparatus shown in FIG. 1 are tabulated for a range of air pressures and fuel demands in Table 1. The air was supplied preheated to the indicated temperatures at the indicated pressures of between 1.35 and 2.1 atmospheres. In a typical case such as run No. 3 or 4 there was an air pressure drop between the plenum surrounding the internal housing and the interior of the combustor downstream of the catalyst of about 1 psig. The fuel used was commercial propane containing about 10% propylene. In these runs no routine measurements were made of the relative proportions of the flow of primary air to the thermal combustion zone, of secondary air to the quenching and mixing zone, or of dilution air to the catalyst effluent. However, the relative rates of flow in a typical case were roughly 15% primary air, 35% secondary air, and 50% dilution air. This corresponds to roughly a two-thirds excess of combustion air over the stoichiometric proportions in the thermal combustion zone, or roughly 167% of the stoichiometric amount of primary air. The cooled mixture containing secondary fuel passing through the mixing zone to the catalyst had a temperature ranging from about 850° F. to about 1150° F. The temperature of the catalyst exit was indicated by a thermocouple just downstream of the catalyst; however, high radiation loss from this thermocouple caused this indication to be misleadingly low. The actual catalyst operating temperature was estimated at 200°–400° F. higher than the temperature measured near the catalyst exit, and thus ranged from about 1800° F. to about 2300° F. In runs Nos. 3 to 6 the gases left the combustion apparatus, after being heated by combustion of secondary fuel in the presence of a catalyst and then cooled by the addition of the dilution air to the effluent from the catalyst, at a temperature in the range of about 800° F. to 1200° F. The exit gases from these runs contained undesirable contaminants in remarkably low proportions as shown by Table 1. It is noted that run No. 1 effected all of the combustion in the thermal combustion zone, run No. 7 effected all combustion in the catalyst zone, while the other runs illustrate operation with burning of between about 30% and about 70% of the fuel in the thermal combustion zone.

Turning now to Table 2, operation of the apparatus shown in FIG. 2 is exemplified over a range of fuel demand corresponding to ratings of 330,000 to just over one million Btu per hour. Runs Nos. 10, 11, and 13, made at approximately constant fuel demand, illustrate the effects of variations in the proportions of primary to secondary fuel, which was varied by supplying about 20% to 30% of the fuel to the thermal combustion zone. It appears for this type of apparatus that primary fuel proportions may affect the formation of $NO_x$ rather critically, as indicated particularly by runs Nos. 10, 11, and 13. Run No. 12 is closely comparable with run No. 11 at the same primary fuel flow; these runs suggest a minimum proportion of secondary fuel, depending on the total fuel demand, for limitation of CO in the effluent, since combustion efficiency may drop off markedly at lower catalyst operating temperatures. The proportion of hydrocarbons in the effluents of these runs was so low as to be less than the accuracy of measurement.

As given in Table 2, the temperatures of the thermal combustion in the primary zone, and of the cooled and enriched mixture flowing from the mixing zone into the catalyst, were calculated, as were the adiabatic flame temperatures ("A.F. Temp.") of the latter mixture entering the catalyst. It may be pointed out that that the temperature of the cooled or quenched mixture, which varied between 790° and 1030° F., was measured before introduction of secondary fuel, and that the mixture actually reaching the catalyst was substantially cooler due primarily to the addition of secondary fuel injection-assisting air. The air was supplied for the runs of Table 2 from a blower operating sufficiently above atmospheric pressure to provide the desired flow, and efficient operation was indicated by pressure drops of approximately 1% to 4% between the blower pressure and the pressure in the interior of the combustor. The catalyst operating temperatures were somewhat lower than the calculated adiabatic flame temperatures, due to some unavoidable heat losses, but again were well above the temperatures read near the catalyst exit and are believed to have fallen within the range of about 1950°–2250° F. In obtaining the data for the examples reported, visual observation of the catalyst during operation showed a color ranging from red-orange to yellow-white, supporting the estimates of operating temperatures generally within the limits of 1800°–2300° F.

As just indicated in the described operation of the FIG. 2 apparatus the primary air supplied to the thermal combustion zone, as well as the air added as cooling and secondary air to the heated primary combustion effluent in the upstream portion of the mixing zone, are supplied at about ambient atmospheric pressure, this air also being at about ambient temperature. In the series of runs reported in Table 2, the predetermined total rates of fuel demand at which sustained combustion was effected covered an operating range of total fuel feeds between 16.34 and 48.18 pounds per hour, producing a corresponding range of energy ratings in terms of Btu per hour, and corresponding to a fuel turn-down operating ratio of about 3. Such operation of this combustion apparatus advantageously was carried out by supplying as primary fuel to the thermal combustion zone between about 20 percent and about 30 percent of the total amount of fuel needed for each of the predetermined total rates at which the sustained combustion was effected.

TABLE 1

| Run No: | 1 | 2 | 3 | 4 | 5 | 6 | 7 |
|---|---|---|---|---|---|---|---|
| Air Pres., psig | 5.1 | 8.0 | 9.7 | 12.6 | 15.5 | 15.6 | 16.2 |
| Air Temp., °F | 200 | 205 | 225 | 230 | 408 | 408 | 600 |
| Pri. Fuel, lb/hr | 5.35 | 5.1 | 4.9 | 4.7 | 3.85 | 8.3 | 0.0 |
| Sec. Fuel, lb/hr | 0.0 | 3.4 | 5.1 | 7.5 | 8.45 | 3.85 | 9.5 |
| Pri. Fuel, % | 100 | 60 | 49 | 38.5 | 31.3 | 68.3 | 0.0 |
| Total Air, lb/min | 11.4 | 14.3 | 15.4 | 18.0 | 19.3 | 16.6 | |
| Mixt. to Cat., °F | 705 | 846 | 948 | 1036 | 1138 | 1138 | 600 |

TABLE 1-continued

| Run No: | 1 | 2 | 3 | 4 | 5 | 6 | 7 |
|---|---|---|---|---|---|---|---|
| Cat. Exit Temp., °F | 1308 | 1547 | 1765 | 1922 | 1900 | 1859 | 1990 |
| Effluent: | | | | | | | |
| $CO_2$, % | 1.24 | 1.65 | 1.82 | 2.02 | 2.12 | 2.04 | 2.05 |
| HC, ppm | 3 | 20 | 4 | — | 0.4 | 4.0 | 9. |
| CO, ppm | 35 | 298 | 88 | 39 | 42 | 9.5 | 9. |
| $NO_x$, ppm | 8.6 | 4.4 | 6.2 | 6.4 | 7.2 | 21.2 | — |

TABLE 2

| Run No.: | 8 | 9 | 10 | 11 | 12 | 13 | 14 | 15 |
|---|---|---|---|---|---|---|---|---|
| Demand, kBtu/hr | 339 | 550 | 688 | 695 | 589 | 693 | 920 | 1040 |
| Pri. Fuel, lb/hr | 4.12 | 6.81 | 7.18 | 8.74 | 10.09 | 11.74 | 14.07 | |
| Sec. Fuel, lb/hr | 12.22 | 19.20 | 27.00 | 25.58 | 20.54 | 23.95 | 30.97 | 34.11 |
| Pri. Fuel, % | 25.2 | 26.2 | 21.0 | 25.5 | 29.8 | 29.8 | 27.5 | 29.2 |
| Pri. Air. lb/min | 1.689 | 2.86 | 3.52 | 3.52 | 3.52 | 3.52 | 4.71 | 5.31 |
| Pri. Air, & Stoich. | 170 | 175 | 203 | 167 | 167 | 145 | 167 | 156 |
| Pri. Temp., °F | 2550 | 2490 | 2160 | 2590 | 2590 | 2980 | 2600 | 2760 |
| Sec. Air, lb/min | 5.80 | 9.67 | 12.13 | 12.13 | 12.13 | 12.13 | 16.23 | 18.31 |
| Total Air, lb/min | 7.48 | 12.53 | 15.65 | 15.65 | 15.65 | 15.65 | 20.94 | 23.62 |
| Quenched Mixt., °F | 790 | 880 | 870 | 890 | 910 | 1030 | 660 | 770 |
| Mixt. to Cat., °F | — | — | 674 | 778 | 784 | 874 | — | — |
| Cat. A.F. Temp., °F | 2290 | 2180 | 2383 | 2371 | 2105 | 2358 | 2160 | 2130 |
| Cat. Exit Temp., °F | 1700 | 1800 | 1870 | 1830 | 1670 | 1850 | 1710 | 1815 |
| Effluent CO, ppm | 2.9 | 6.4 | 3.2 | 3.8 | >175. | <50 | 18.3 | 24.0 |
| Effluent $NO_x$, ppm | 2.9 | 5.0 | 6.8 | 11.0 | 9.0 | 13.5 | 2.8 | 4.3 |

What is claimed is:

1. A method for effecting sustained combustion of a carbonaceous fuel at predetermined total rates of fuel demand, utilizing combustion apparatus including a thermal combustion zone and downstream thereof in succession a mixing zone and a catalyst zone, wherein for at least one of said total rates of fuel demand substantial portions of said fuel are burned in each of said thermal combustion zone and said catalyst zone, comprising:

supplying, during operation at said one fuel demand rate, a substantial portion of the fuel to said thermal combustion zone while simultaneously supplying air to said thermal combustion zone to effect substantially complete combustion therein of the fuel being supplied thereto with formation of a heated effluent;

adding to said heated effluent in an upstream portion of said mixing zone an additional amount of relatively cool air to obtain a cooled mixture;

adding to said cooled mixture passing through a downstream portion of said mixing zone a substantial additional portion of said fuel, making up the total needed for said one fuel demand rate, to provide an enriched fuel-air admixture;

passing said enriched fuel-air admixture through said mixing zone to the catalyst without substantial recirculation or stagnation; and combusting said enriched fuel-air admixture in the presence of said catalyst to form an effluent of high thermal energy, said additional amount of air being sufficient to maintain said cooled mixture and said enriched fuel-air admixture at temperatures within the range of about 500°–1200° F. in said mixing zone, thus avoiding any preignition or preburning of said additional fuel, and the resulting fuel-air admixture having an adiabatic flame temperature such that, upon contact with said catalyst, the operating temperature of said catalyst is substantially above the instantaneous auto-ignition temperature of said fuel-air admixture but below a temperature that would result in any substantial formation of oxides of nitrogen.

2. The method of claim 1 wherein said carbonaceous fuel supplied to said thermal combustion zone and added to said cooled mixture has, when burned with a stoichiometric amount of air, an adiabatic flame temperature of at least about 3300° F.

3. The method of claim 2 wherein the sustained combustion of said carbonaceous fuel is carried out under essentially adiabatic conditions.

4. The method of claim 3 wherein the rates at which said fuel and air are supplied to said mixing zone are adjusted and proportioned to cause said resulting fuel-air admixture to have an adiabatic flame temperature such that said operating temperature of the catalyst is about 1700°–3200° F.

5. The method of claim 3 wherein the rates at which said fuel and air are supplied to said mixing zone are adjusted and proportioned to cause said resulting fuel-air admixture to have an adiabatic flame temperature such that said operating temperature of the catalyst is about 2000°–3000° F.

6. The method of claim 1 wherein the amount of air supplied to said thermal combustion zone to effect substantially complete combustion of the fuel being supplied thereto is maintained at between about 125 percent and about 185 percent of the stoichiometric amount needed for complete combustion of said fuel being supplied thereto.

7. The method of claim 6 wherein the rates at which said fuel and air are supplied to said mixing zone are adjusted and proportioned to cause said resulting fuel-air admixture to have an adiabatic flame temperature such that said operating temperature of the catalyst is about 1700°–3200° F.

8. The method of claim 1 wherein said carbonaceous fuel supplied to the thermal combustion zone and added in the mixing zone is a liquid fuel.

9. The method of claim 8 wherein said liquid fuel added to said cooled mixture is injected into said mixing zone and is admixed with the gases passing therethrough so that said enriched fuel-air admixture from said mixing zone has the form of an intimate admixture upon contact with the catalyst.

10. The method of claim 1 wherein between about 20 percent and about 70 percent of the total amount of fuel needed for the fuel demand rate at which said combustion is being effected is supplied to said thermal combustion zone.

11. The method of claim 1 wherein said additional amount of air is added in said mixing zone at a rate sufficient to maintain said cooled mixture and said enriched fuel-air admixture at a temperature of about 700°–1000° F.

12. The method of claim 1 wherein the air supplied to said thermal combustion zone and the air added to said heated effluent in the upstream portion of the mixing zone are supplied at about ambient temperature and pressure, and wherein, for each of said predetermined total rates of fuel demand at which said sustained combustion is effected, between about 20 percent and about 30 percent of the total amount of fuel needed is supplied to said thermal combustion zone.

* * * * *

UNITED STATES PATENT AND TRADEMARK OFFICE
CERTIFICATE OF CORRECTION

PATENT NO. : 4,118,171
DATED : October 3, 1978
INVENTOR(S) : Flanagan et al

Page 1 of 2

It is certified that error appears in the above-identified patent and that said Letters Patent are hereby corrected as shown below:

In Column 14, Table 1, the sixth line entitled "Total Air, lb/min, under Column heading 5, change [19.3] to --19.2--, under Column heading 6, change [16.6] to --19.3--, under column heading 7, insert in blank the number --16.6--.

In Column 15, Table 2, the first line entitled "Demand, kBtu/hr", under column 8, change [339] to --330--, in the second line entitled "Pri. Fuel, lb/hr.", under column heading 12, change [10.09] to --8.74--, under column heading 13, change [11.74] to --10.09--,

UNITED STATES PATENT AND TRADEMARK OFFICE
CERTIFICATE OF CORRECTION

PATENT NO. : 4,118,171
DATED : October 3, 1978
INVENTOR(S) : Flanagan et al

Page 2 of 2

It is certified that error appears in the above-identified patent and that said Letters Patent are hereby corrected as shown below:

under column heading 14, change [14.07] to --11.74--, under column heading 15, insert in blank space --14.07--.

In the fifth line, under column 8, change [1.689] to --1.68--.

In the sixth line, in the first column, after "Pri. Air, and before "Stoich" remove [&] and insert --%--.

Signed and Sealed this

Fifteenth Day of May 1979

[SEAL]

Attest:

RUTH C. MASON
Attesting Officer

DONALD W. BANNER
Commissioner of Patents and Trademarks